United States Patent [19]

Torloting

[11] 4,267,083
[45] May 12, 1981

[54] HEAT-STABILIZED VINYL CHLORIDE POLYMERS

[75] Inventor: Jean-Claude Torloting, Saint-Auban, France

[73] Assignee: Rhone-Poulenc Industries, Paris, France

[21] Appl. No.: 38,138

[22] Filed: May 11, 1979

[30] Foreign Application Priority Data

May 12, 1979 [FR] France ............................ 78 15156

[51] Int. Cl.$^3$ ............................................ C08K 5/34
[52] U.S. Cl. ......................... 260/23 XA; 252/400 A; 260/45.75 W; 260/45.8 N
[58] Field of Search ................ 260/45.8 N, 45.75 W, 260/23 XA; 252/400 A

[56] References Cited

U.S. PATENT DOCUMENTS 4,102,839  7/1978  Crochemore et al. ......... 260/23 XA

FOREIGN PATENT DOCUMENTS 2239496  2/1975  France .
1443613  7/1976  United Kingdom .

*Primary Examiner*—V. P. Hoke

*Attorney, Agent, or Firm*—Burns, Doane, Swecker & Mathis

[57] ABSTRACT

Vinyl chloride polymers are heat-stabilized by formulating therewith heat-stabilizing amounts of (i) an organometallic salt couplet, (ii) at least one organic $\beta$-diketone having the structural formula $R_1$—CO—CH$R_3$—CO—$R_2$ and (iii) a substituted dihydropyridine having the structural formula:

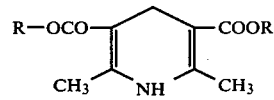

in which formulae R is alkyl or alicyclic having up to 20 carbon atoms, or phenyl, each $R_1$ and $R_2$, which can be identical or different, is a member selected from the group comprising hydrogen, a linear or branched chain alkyl or alkenyl radical having up to 36 carbon atoms, an aralkyl radical having from 7 to 36 carbon atoms, and an aryl or cycloaliphatic radical having up to 14 carbon atoms, with the proviso that $R_1$ and $R_2$ cannot both be hydrogen, and $R_3$ is hydrogen or —CO—X, wherein X is R, or —NH—Y, with Y being aryl.

17 Claims, No Drawings

HEAT-STABILIZED VINYL CHLORIDE POLYMERS

BACKGROUND OF THE INVENTION

1. Field of the Innvention

The present invention relates to heat-stabilized polyvinyl chloride compositions, and, more especially, to such PVC compositions adapted for the production of transparent shaped articles.

2. Description of the Prior Art

From U.S. Pat. No. 4,102,839, hereby expressly incorporated by reference, it is known that the admixture of β-diketone compounds, together with organometallic salts, is a useful stabilizer for compositions based on vinyl chloride polymer.

Furthermore, it too is known that PVC which is destined, inter alia, for the production of hollow shaped articles by extrusion/blow molding can be stabilized with from about 0.2 to 1.5% by weight, relative to the polymer, of at least one 2,6-dimethyl-1,4-dihydropyridine-3,5-dicarboxylate [compare French Pat. No. 73/28,524, also hereby expressly incorporated by reference], and British Pat. No. 1,443,613.

SUMMARY OF THE INVENTION

It has now surprisingly been found that a synergistic effect exists between the β-diketone compounds and the substituted dihydropyridines which enables an even greater heat-stabilization of such PVC compositions, and which synergism can even be attained utilizing reduced amounts of the noted stabilizers.

DETAILED DESCRIPTION OF THE INVENTION

More particularly, a major object of this invention is the provision of PVC compositions comprising a stabilizing amount of organometallic salts, especially a salt couplet or pair of organic salts of the following metal pairs: Ca-Zn, Ca-Cd, Ba-Zn or Ba-Cd, and which compositions are characterized in that same additionally comprise a heat-stabilizing amount of [i] at least one organic β-diketone compound of the structural formula $R_1$—CO—$CHR_3$—CO—$R_2$ and [ii] a substituted dihydropyridine of the structural formula:

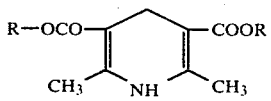

in which formulae R is alkyl or alicyclic having up to 20 carbon atoms or phenyl and $R_1$ and $R_2$, which can be identical or different, represent: a linear or branched alkyl or alkenyl radical having up to 36 carbon atoms, an aralkyl radical having from 7 to 36 carbon atoms or an aryl or cycloaliphatic radical having fewer than 14 carbon atoms [which cycloaliphatic radicals optionally include a carbon-carbon double bond].

The aforementioned radicals can be substituted or unsubstituted, typical substituents being halogen atoms or, in the case of aryl or cycloaliphatic radicals, methyl or ethyl radicals; same can also be modified by the presence of one or more of the linkages

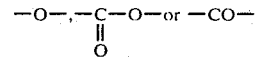

in the aliphatic chain. Moreover, taken together same can represent a divalent alkylene radical having 2 to 5 carbon atoms, which optionally contains a bridging oxygen or nitrogen atom.

The radicals represented by the symbols $R_1$ and $R_2$ are also such that: for $R_1$ and $R_2$, the carbon atom bonded to the carbonyl group is free from ethylenic or carbonyl unsaturation, and, for $R_1$ or $R_2$, the carbon atom bonded to the carbonyl group is free from aromatic unsaturation.

One of the radicals $R_1$ or $R_2$, but not both, can be a hydrogen atom.

$R_3$ is a hydrogen atom or a group —CO—X, X representing a radical $R_1$, as defined above, or a radical —NH—Y, Y being an aryl radical which may or may not be substituted, also as defined above.

The term "composition based on polyvinyl chloride" is intended to connote compositions containing a homopolymer or copolymer of vinyl chloride and the various adjuvants which are commonly used for facilitating processing or for imparting special properties to any article shaped therefrom.

Any type of vinyl chloride homopolymer is suitable, regardless of its method of preparation, whether bulk, suspension or dispersion polymerization, or any other type of polymerization, and regardless of its intrinsic viscosity.

Numerous vinyl chloride copolymers can also be stabilized against the effects of heat by means identical to those used for the homopolymers. Same include, for example, copolymers obtained by the copolymerization of vinyl chloride with other comonomers comprising a polymerizable ethylenic bond, for example, vinylidene chloride, ethylene, acrylic acid esters, styrene, vinyl esters, maleic acid or anhydride, maleic acid esters, and the like.

The copolymers, typically contain at least 50% by weight of vinyl chloride. However, the invention is especially applicable to copolymers which contain at least 80% by weight of vinyl chloride and in which the other monomer is vinyl acetate or vinylidene chloride.

The homopolymers or copolymers can be either "rigid" or "flexible". When "rigid" polymers are used, they can comprise agents for modifying the impact strength, pigments and/or fillers, lubricants and the like, in addition to the resin and the stabilizers. When "flexible" polymers are used, they can comprise plasticizers, pigments and/or fillers, lubricants and the like, also in addition to the resin and the stabilizers.

All of the plasticizers which are conventionally employed for plasticizing PVC are suitable. Such plasticizers are described, e.g., in *Encyclopedia of Polymer Science and Technology,* volume 14, pages 396 to 400, published by Interscience Publishers [1964]. The amount of plasticizer used is generally between 5 and 60% by weight, relative to the polymer.

Antioxidants or "light" or UV stabilizers can also be added to the compositions of the invention.

The stabilizers which consist of organic salts of metals per the invention are essentially calcium, barium, zinc or cadmium salts of aliphatic organic carboxylic acids or fatty acids, which may or may not be saturated and may or may not be substituted, or of aromatic carboxylic acids. Among the salts which are advantageously used, representative are the acetates, diacetates, stearates, oleates, laurates, palmitates, benzoates, hydroxystearates, 2-ethylhexanoates and phenates.

Same are employed in the form of pairs or couplets, such as: calcium/zinc, barium/cadmium, calcium/cadmium or barium/zinc, in proportions between 0.01 and 5% by weight, and preferably between 0.1 and 2% by weight, relative to the polymer.

These pairs of metal salts can optionally be utilized together with an organo-tin mercaptide.

It is also envisaged to add, to the subject stabilizers, other organic compounds which are known for their stabilizing activity, such as, for example, alkyl- or arylphosphites and/or epoxide derivatives, such as, for example, epoxidized soya oils, and/or polyols.

Any polyol is suitable. However, aliphatic compounds having at least 2, and preferably 4, hydroxyl groups are preferred. The cycloaliphatic compounds which contain at least two primary alcohol groups as substituents are also suitable.

Particularly attractive results are obtained with the following polyols: D-xylitol, D-sorbitol, D-mannitol, diglycerol, 4-hydroxy-3,3,5,5-tetrahydroxymethyltetrahydrofurane, trihydroxyethyl isocyanurate, polyvinyl alcohol, trimethylolpropane, tetramethylolcyclohexanol, quinic acid, adnitol, α-methylglucoside and glycerol. Amounts between 0.5% and 2% by weight afford good results.

Any β-diketone compound, the use of which has been suggested in U.S. Pat. No. 4,102,839 [expressly incorporated by reference], is suitable. Particularly valuable results are obtained utilizing stearoylbenzoylmethane or benzoylacetone. These diketone compounds are employed in proportions between 0.005 and 2%, and preferably between 0.05 and 1%, by weight, relative to the polymer.

Among the substituted dihydropyridine compounds, those compounds disclosed in French Pat. No. 2,239,494 [expressly incorporated by reference], and, more precisely, those compounds in which R is an alkyl radical having from 2 to 20 carbon atoms, are preferred. The compounds in which R is an alkyl radical having from 8 to 14 carbon atoms afford particularly valuable results when used together with the above-mentioned β-diketone compounds. Same are employed in proportions between 0.005 and 2%, and preferably between 0.05 and 0.5%, by weight, relative to the polymer.

The compositions according to the invention can be formulated by any known process. The various stabilizers can be mixed with the plasticizer, either individually or after they have been admixed with one another, and then incorporated into the polymer. All the customary methods known to this art are suitable for mixing the ingredients. However, the composition can advantageously be homogenized by means of a malaxator or a roller mixer and the operation can be carried out at a temperature which is such that the mass is fluid, thus facilitating mixing. This temperature can be, for example, on the order of 100° C.

The composition of the invention can be processed in accordance with any and all the techniques which are conventionally employed for working or shaping PVC compositions, for example, by extrusion, by injection molding, by calendering, by slush-molding, by coating with a paste or by deposition on a support which may or may not be anti-stick [release], or by extrusion/blow molding.

The fact that the use of a β-diketone stabilizer together with a substituted dihydropyridine compound provides a synergistic effect, enables a reduction in the amounts of these stabilizers to be employed, while at the same time combining the positive effects of both types of stabilizer, namely, the absence of initial coloration due to degradation when the formulation is processed, the continued absence of initial coloration, and the improved heat stability, in the event of heat treatment, either of the unshaped material or of any final shaped article.

In order to further illustrate the present invention and the advantages thereof, the following specific examples are given, it being understood that same are intended only as illustrative and in nowise limitative.

EXAMPLES 1 TO 8

A composition A was prepared which was useful, in particular, for the extrusion/blow molding of bottles and which consisted of: 100 parts by weight of a polyvinyl chloride powder having a viscosity index of 80 [French Standard Specification T 51,013] obtained by suspension polymerization in water, 10 parts by weight of an agent for improving impact strength, which agent was a copolymer of butadiene, styrene and methyl methacrylate, 1 part by weight of an acrylic copolymer [processing aid], 3 parts of epoxidized soya oil, 0.05 part of zinc stearate, 0.1 part of calcium stearate and 0.1 part of blue pigment.

Various amounts, in grams, of stearoylbenzoylmethane [SBM], of 2,6-dimethyl-1,4-dihydropyridine-3,5-dilaurylcarboxylate [DHP] and of calcium stearate [CaS] were added to 100 g of composition A and the resulting novel compositions were processed for 5 minutes at 180° C. on a roller malaxator.

Samples were taken from a sheet processed therefrom [of 2.5 mm thickness] and were placed for varying periods of time in a press heated to 185° C. The time taken for a sample to blacken, which sample initially was colorless and transparent, is noted [such time being a means for measuring the heat stability of the composition; it is referred to as the breakdown time].

Furthermore, the coloration of the various samples was graded by comparison with a contrived standard scale ranging from 0 to 20, the sample graded 0 being bluish and transparent [crystal] and the sample graded 20 being black and opaque, and the scale spanning the entire color range from yellow to increasingly deep brown.

This standard scale was derived from the Gardner scale employed with a Lovibond comparator disc, the intitial coloration being slightly bluish [presence of blue colorant] and not absolutely colorless.

The following results were obtained:

TABLE I

| Example | Stabilizers Added | | | Time, in minutes, of the Heat treatment at 185° C. | | | | | | |
|---|---|---|---|---|---|---|---|---|---|---|
| | SBM | DHP | CaS | 0 | 10 | 20 | 30 | 40 | 50 | 60 |
| 1 | 0 | 0.4 | 0 | 4 | 5 | 7 | 13 | black | | |
| 2 | 0 | 0.4 | 0.2 | 8 | 11 | 11 | 11 | 15 | 19 | black |
| 3 | 0.4 | 0 | 0 | 2 | 12 | 16 | 18 | black | | |
| 4 | 0.4 | 0 | 0.2 | 2 | 7 | 12 | 14 | 17 | 18 | black |
| 5 | 0.2 | 0.1 | 0 | 2 | 3 | 10 | 16 | black | | |
| 6 | 0.2 | 0.1 | 0.2 | 2 | 4 | 7 | 13 | 17 | 18 | black |
| 7 | 0.1 | 0.2 | 0 | 2 | 4 | 7 | 16 | black | | |
| 8 | 0.1 | 0.2 | 0.2 | 3 | 5 | 8 | 16 | 17 | 18 | black |

From the results of the aforesaid very severe test, it was found that the addition of calcium stearate made it possible to extend the breakdown time [time in which the sample blackens] by 20 minutes.

In particular, it was found that results which were overall on the same order were obtained by replacing 0.4% of the β-diketone or dihydropyridine compounds by, respectively, 0.2 and 0.1% or 0.1 and 0.2% of such compounds, this representing a decrease of 25% by weight of these stabilizers. It will be noted that, during the first 10 minutes, which corresponds to the usual processing time of the composition in a typical processing apparatus, the stabilization was distinctly improved by using a mixture of both organic stabilizers.

EXAMPLE 9

A composition B having the following composition:

| [i] | Polyvinyl chloride [as in Example 1] | 100 parts |
|---|---|---|
| [ii] | Agent for improving impact strength [as in Example 1] | 10 parts |
| [iii] | Epoxidized soya oil | 4 parts |
| [iv] | Calcium stearate | 0.2 part |
| [v] | Zinc stearate | 0.2 part | was prepared.

0.25 part of stearoylbenzoylmethane, 0.20 part of 2,6-dimethyl-1,4-dihydropyridine-3,5-laurylcarboxylate and 0.2 part of calcium stearate were added to 100 parts of the composition B.

This mixture displayed a heat stability [breakdown time] of 90 minutes, as determined in a press at 185° C. in accordance with the preceding examples.

Bottles were extrusion/blow molded from this mixture. The resulting bottles, which were colorless, were ground and the chips obtained were re-used in extrusion/blow molding in order to again produce bottles therefrom. Eight successive recycles of the same amount of the stabilized mixture were thus conducted.

It was found that, as the number of recycles increases, the color changed but very slightly, and it was not until the fifty recycle that the bottles attained a yellowish coloration.

In order to obtain the same effect on the coloration of the bottles, the above stabilizing system must be replaced by 0.7 part of steroylbenzoylmethane and 0.2 part of calcium stearate. In this event, the heat stability was also 90 minutes.

In order to again obtain the same effect on the coloration of the bottles, it too was necessary to replace the above stabilizing system by 0.7 part of 3,6-dimethyl-1,4-dihydropyridine-3,5-laurylcarboxylate. However, in this latter event, the heat stability [breakdown time] was only 60 minutes and the bottles obtained from the initial composition were slightly more colored.

In order to increase such heat stability [breakdown time] to 90 minutes, it was necessary to add an additional 0.2 part of calcium stearate and, in this particular case, the bottles obtained by extrusion/blow molding were distinctly more colored, as per the first operation.

EXAMPLES 10 TO 15

A composition C was prepared, in the same manner as composition A [Example 1], from the following constituents [of the same nature as those of Example 1]:
- [i] 100 parts by weight of polyvinyl chloride;
- [ii] 10 parts by weight of an agent for improving impact strength;
- [iii] 1 part of a lubricant [rosin ester];
- [iv] 4 parts of epoxidized soya oil;
- [v] 0.2 part of calcium stearate; and
- [vi] 0.2 part of zinc stearate.

Various amounts, in grams, of benzoylacetone [BA], of 2,6-dimethyl-1,4-dihydropyridine-3,5-diethylcarboxylate [DHPE] and of calcium stearate [CaS] were added to 57.5 g of the composition B. The resulting novel compositions obtained were processed for 3 minutes at 180° C. on a roller malaxator. A 2.5 mm thick sheet was obtained, from which samples were taken and placed in a ventilated oven at 180° C. for varying periods of time.

The change in the coloration of the samples according to the normalized Gardner scale was graded utilizing a Lovibond disc. Furthermore, the breakdown time [sample has blackened] was noted. The following results are obtained:

TABLE II

| | Stabilizers added | | | Time, in minutes, of the heat treatment at 180° C. | | | | | | | |
|---|---|---|---|---|---|---|---|---|---|---|---|
| Example | BA | DHPE | CaS | 0 | 7 | 14 | 21 | 30 | 40 | 50 | Breakdown time |
| 10 | | 0.3 | | 0.5 | 1.5 | 2 | 3 | 3.5 | 5 | black | |
| 11 | | 0.3 | 0.2 | 1.5 | 2.5 | 3 | 3.5 | 4 | 5 | 6 | 74 minutes |
| 12 | 0.3 | | | 0 | 0 | 1 | 3.5 | 5 | 6 | 8 | 55 minutes |
| 13 | 0.3 | | 0.2 | 0 | 0 | 1.5 | 3 | 5 | 6 | 7 | >80 minutes |
| 14 | 0.15 | 0.1 | | 0 | 0 | 1 | 2.5 | 4 | 6 | 8 | 57 minutes |
| 15 | 0.15 | 0.1 | 0.2 | 0 | 0 | 1 | 2 | 4 | 6 | 6 | >80 minutes |

The influence of the level of calcium, which make it possible to extend the breakdown time, was noted. However, it was observed, in particular, that the simultaneous use of lesser amounts of benzoylacetone and of dimethyldihydropyridinediethylcarboxylate, compared to employment of each of the organic stabilizers by itself, made it possible to improve the heat stabilization at least up to 30 minutes.

EXAMPLES 16 TO 25

A composition D having the following composition:

| [i] | Polyvinyl chloride | 100 parts |
|---|---|---|
| [ii] | Agent for improving impact strength | 10 parts |
| [iii] | Wax E | 1 part |
| [iv] | Epoxidized soya oil | 4 parts |
| [v] | Zinc stearate | 0.2 part |
| [vi] | Calcium 2-ethylhexanoate | 0.4 part | was prepared as indicated above.

Acetylmethylheptenone [AMH], para-methoxybenzoylstearoylmethane [PMBS] and 3-N-phenylcarbamoyl-3-benzoylacetone [PCBA] of the formula

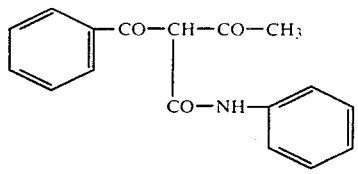

were used as organic stabilizers. The following results were obtained.

TABLE III

| Example | Stabilizers added DHPE | Stabilizers added AMH | Time, in minutes, of the heat treatment at 180° C. 0 | 7 | 14 | 21 | 30 | 40 | 50 | Breakdown time |
|---|---|---|---|---|---|---|---|---|---|---|
|  |  |  | Control composition D |  |  |  |  |  |  |  |
|  |  |  | 6 | 8 | 8 | 9 | 9 | 10 | 11 | 80 minutes |
| 16 |  | 0.3 | 0 | 0 | 1.5 | 3 | 4 | 5 | 7 | 80 minutes |
| 17 | 0.3 |  | 1.5 | 2.5 | 3 | 3.5 | 4 | 5 | 6 | >80 minutes |
| 18 | 0.1 | 0.15 | 0 | 0 | 1 | 2.5 | 3.5 | 4 | 6 | 70 minutes |
| 19 | 0.15 | 0.1 | 0.5 | 2 | 3 | 4 | 4.5 | 5 | 8 | >80 minutes |
|  |  | PCBA |  |  |  |  |  |  |  |  |
| 20 |  | 0.3 | 1 | 1.5 | 3 | 4 | 4.5 | 7 | 10 | 80 minutes |
| 21 | 0.3 |  | 1.5 | 2.5 | 3 | 3.5 | 4 | 5 | 6 | >80 minutes |
| 22 | 0.1 | 0.15 | 0 | 0 | 1 | 2.3 | 3 | 4 | 6 | >80 minutes |
|  | DHP | PMBS |  |  |  |  |  |  |  |  |
| 23 |  | 0.4 | 0 | 0.5 | 1.5 | 3 | 4 | 5 | 6 | 70 minutes |
| 24 | 0.4 |  | 2 | 3 | 4 | 4 | 5 | 5 | 6 | 80 minutes |
| 25 | 0.1 | 0.2 | 0 | 0 | 1 | 2.5 | 3 | 4.5 | 6 | >80 minutes |

EXAMPLES 26 TO 28

A composition E having the following composition:

| [i] | Polyvinyl chloride | 100 parts |
|---|---|---|
| [ii] | Agent for improving impact strength | 10 parts |
| [iii] | Wax E | 1 part |
| [iv] | Epoxidized soya oil | 4 parts |
| [v] | Barium stearate | 0.4 part |
| [vi] | Zinc stearate | 0.2 part | was prepared as indicated above.

Stearoylacetone [SA] and dimethyldihydropyridinedilaurylcarboxylate [DHP] were employed as organic stabilizers.

The following results were obtained:

TABLE IV

| Example | Stabilizers added DHP | Stabilizers added SA | Time, in minutes, of the heat treatment at 180° C. 0 | 7 | 14 | 21 | 30 | 40 | 50 | Breakdown time |
|---|---|---|---|---|---|---|---|---|---|---|
|  |  |  | Control composition E |  |  |  |  |  |  |  |
|  |  |  | 9 | 11 | 11 | 11 | 11 | 11 | 10 | 65 minutes |
| 26 |  | 0.4 | 0 | 1 | 1.5 | 2 | 2.5 | 3.5 | 5 | 65 minutes |
| 27 | 0.4 |  | 1 | 3 | 4.5 | 5 | 5 | 6 | 6 | 65 minutes |
| 28 | 0.1 | 0.2 | 0 | 1.5 | 2.5 | 3 | 3 | 4 | 5 | 65 minutes |

It was found that the synergistic effect between the two organic compounds was less marked on replacing the calcium salts by barium salts. However, such effect indeed exists, but only to a lesser degree.

EXAMPLES 29 TO 31

A composition F having the following composition:

| [i] | Polyvinyl chloride | 100 parts |
|---|---|---|
| [ii] | Agent for improving impact strength | 10 parts |
| [iii] | Wax E | 1 part |
| [iv] | Epoxidized soya oil | 4 parts |
| [v] | Zinc para-tert.-butylbenzoate | 1.2 parts |
| [vi] | Calcium stearate | 4 parts | was prepared as indicated above.

Laurylstearoylmethane [LSM] and dimethyldihydropyridinedilaurylcarboxylate [DHP] were employed as organic stabilizers.

The following results were obtained:

TABLE V

| Example | Stabilizers added LSM | Stabilizers added DHP | Time, in minutes, of the heat treatment at 180° C. 0 | 7 | 14 | 21 | 30 | 40 | 50 | Breakdown time |
|---|---|---|---|---|---|---|---|---|---|---|
|  |  |  | Control composition F |  |  |  |  |  |  |  |
|  |  |  | 6 | 7 | 7 | 8 | 9 | 9 | 10 | 80 minutes |
| 29 | 0.5 |  | 0 | 0 | 1 | 2.5 | 4 | 4.5 | 7 | >80 minutes |
| 30 |  | 0.5 | 2 | 3 | 4 | 4 | 4.5 | 5 | 5.5 | 70 minutes |
| 31 | 0.3 | 0.1 | 0 | 0 | 0.5 | 2 | 3 | 4.5 | 5.5 | 80 minutes |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a composition of matter comprising a vinyl chloride polymer and a heat-stabilizing amount of divalent metal salts of aliphatic or aromatic carboxylic acids or of phenols, the improvement which comprises, as a co-stabilizer therefor, a heat-stabilizing amount of (i) at least one organic β-diketone having the structural formula $R_1$—CO—$CHR_3$—CO—$R_2$ and (ii) a substituted dihydropyridine having the structural formula:

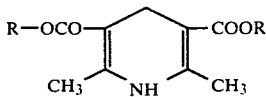

in which formulae R is alkyl or alicyclic having up to 20 carbon atoms, or phenyl, each $R_1$ and $R_2$, which can be identical or different, is a member selected from the group comprising hydrogen, a linear or branched chain alkyl or alkenyl radical having up to 36 carbon atoms, an aralkyl radical having from 7 to 36 carbon atoms, and an aryl or cycloaliphatic radical having up to 14 carbon atoms, with the proviso that $R_1$ and $R_2$ cannot both be hydrogen, and $R_3$ is hydrogen or —CO—X, wherein X is R, or —NH—Y, with Y being aryl, as above defined.

2. The composition of matter as defined by claim 1, wherein at least one of R, $R_1$, $R_2$ and $R_3$ is halosubstituted.

3. The composition of matter as defined by claim 1, wherein at least one of R, $R_1$, $R_2$ and $R_3$ is aryl or cycloaliphatic bearing lower alkyl substituents.

4. The composition of matter as defined by claim 1, wherein at least one of R, $R_1$, $R_2$ and $R_3$ comprises an aliphatic bridging linkage selected from those of the formulae:

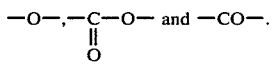

5. The composition of matter as defined by claim 1, wherein any two of $R_1$, $R_2$ and $R_3$ are joined together to define a divalent lower alkylene radical, or an oxygen or nitrogen interrupted divalent lower alkylene radical.

6. The composition of matter as defined by claim 1, wherein at least one of R, $R_1$, $R_2$ and $R_3$ is cycloalkenyl.

7. The composition of matter as defined by any of claims 1 to 6, comprising from 0.05 to 1% by weight, relative to the polymer, of the β-diketone (i), and from 0.05 to 1% by weight, also relative to the polymer, of the dihydropyridine (ii).

8. The composition of matter as defined by claim 7, comprising from 0.01 to 5% by weight, relative to the polymer, of the metal salts.

9. The composition of matter as defined by claim 8, wherein the metal salts comprise one of the metal pairs: calcium/zinc, barium/cadmium, calcium/cadmium or barium/zinc.

10. The composition of matter as defined by claim 1, wherein the dihydropyridine (ii) is selected from the group consisting of 2,6-dimethyl-1,4-dihydropyridine-3,5-diethylcarboxylate and 2,6-dimethyl-1,4-dihydropyridine-3,5-dilaurylcarboxylate.

11. The composition of matter as defined by claim 1, wherein the β-diketone (i) is selected from the group consisting of benzoylacetone, stearoylacetone or stearoylbenzoylmethane.

12. The composition of matter as defined by claim 1, wherein each R is alkyl having from 2 to 14 carbon atoms.

13. The composition of matter as defined by claim 1, wherein the vinyl chloride polymer is polyvinyl chloride homopolymer.

14. The composition of matter as defined by claim 1, wherein the vinyl chloride polymer is a copolymer of vinyl chloride with up to 50% of an olefinically unsaturated comonomer copolymerizable therewith.

15. A shaped article comprising the composition of matter as defined by any one of claims 1 to 6.

16. A composition of matter comprising (i) metal salts, (ii) at least one organic β-diketone having the structural formula $R_1$—CO—$CHR_3$—CO—$R_2$ and (iii) a substituted dihydropyridine having the structural formula:

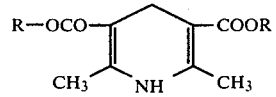

in which formulae R is alkyl or alicyclic having up to 20 carbon atoms, or phenyl, each $R_1$ and $R_2$, which can be identical or different, is a member selected from the group comprising hydrogen, a linear or branched chain alkyl or alkenyl radical having up to 36 carbon atoms, an aralkyl radical having from 7 to 36 carbon atoms, and an aryl or cycloaliphatic radical having up to 14 carbon atoms, with the proviso that $R_1$ and $R_2$ cannot both be hydrogen, and $R_3$ is hydrogen or —CO—X, wherein X is R, or —NH—Y, with Y being aryl, as above defined.

17. The method for heat-stabilizing a vinyl chloride polymer, which comprises formulating therewith the composition of matter as defined by claim 16.

* * * * *